United States Patent [19]

Roellchen

[11] 4,385,091
[45] May 24, 1983

[54] PREMOLDED EXPANDABLE POLYSTYRENE SHEET FROM WHICH SUPPORTING AND SPACING MEMBERS FOR WEB MATERIAL ROLLS ARE TO BE CUT

[75] Inventor: Thomas A. Roellchen, Almeda Township, Van Buren County, Mich.

[73] Assignee: Ace Polymers, Inc., Kalamazoo, Mich.

[21] Appl. No.: 235,827

[22] Filed: Feb. 19, 1981

[51] Int. Cl.³ ............................ B32B 3/26; B32B 5/18
[52] U.S. Cl. .................................. 428/134; 428/156; 428/542.8
[58] Field of Search ................ 428/131, 132, 134–136, 428/542, 156, 542.8; 108/901, 51.1; 248/346

[56] References Cited

U.S. PATENT DOCUMENTS 3,951,078  4/1976  Fowler et al. ................... 108/901
3,967,993  7/1976  Isomi .............................. 428/136
4,103,857  8/1978  Levenhagen .................... 108/901
4,240,557  12/1980 Dickens .......................... 108/901

Primary Examiner—Paul J. Thibodeau
Attorney, Agent, or Firm—Flynn, Thiel, Boutell & Tanis

[57] ABSTRACT

A molded sheet of expandable polystyrene material has a generally rectangular shape and a plurality of spaced, parallel openings extending therethrough. The openings are arranged in spaced, parallel rows. In a preferred embodiment, a plurality of cavities are molded into the surface of the sheet to minimize deformation during molding as the sheet cures. A stack of such sheets is placed in a single grid electric wire cutter having a plurality of spaced, parallel, hot wires, and the wires are simultaneously passed through the stack to cut each sheet into plural elongated members, the surface of each of the openings in any given row of openings being substantially bisected into two substantially semicylindrical portions by a respective one of the wires. The elongated members thus obtained are adapted for use in protectively supporting and spacing a plurality of rolls of material such as cellophane in a multi-layer stack for storage or shipping.

5 Claims, 5 Drawing Figures

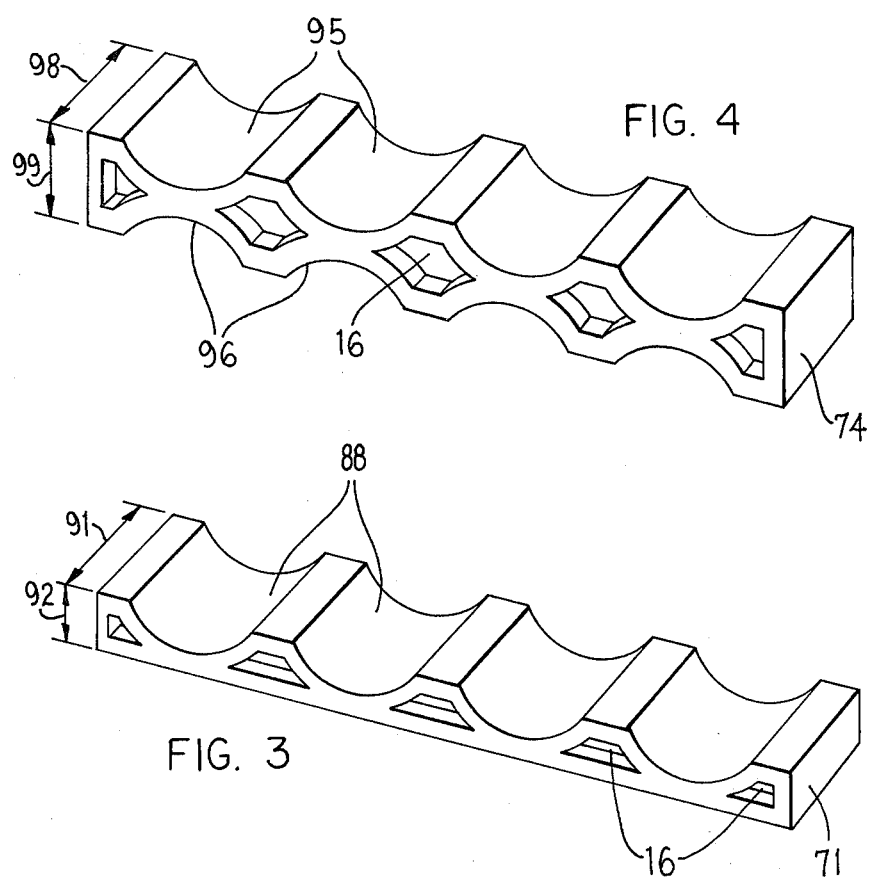

PREMOLDED EXPANDABLE POLYSTYRENE SHEET FROM WHICH SUPPORTING AND SPACING MEMBERS FOR WEB MATERIAL ROLLS ARE TO BE CUT

FIELD OF THE INVENTION

This invention relates to support members for protectively supporting and spacing a plurality of rolls of material such as cellophane in a multi-layer stack and, more particularly, relates to a molded sheet of expandable polystyrene from which the support members are cut.

BACKGROUND OF THE INVENTION

Certain types of material, such as cellophane, are typically stored and transported in cylindrical rolls. Shipping and storing a plurality of such rolls presents certain disadvantages, however, in that the rolls have limited stability when stood on end and tend to roll if laid on their sides. In addition, when the rolls are of a material such as cellophane which is easily damaged, they require a high degree of protection during shipment.

One approach to solving the foregoing problem is disclosed in U.S. Pat. No. 4,195,732, in which elongated elements having spaced indentations therein are adapted for protectively supporting and spacing a plurality of rolls of cellophane material. The elongated elements are placed between the rolls and a pallet, between stacked layers of the rolls, and on top of the stack, and the stack is then strapped to the pallet. This solution to the problem is relatively effective in practice, but has not been satisfactory in all respects. In particular, it has not proved to be sufficiently cost effective, because individually molding each of the elongated elements is expensive and time consuming.

Accordingly, it is an object of the present invention to provide a relatively fast and inexpensive method of producing elongated members of expandable polystyrene which are adapted for protectively supporting and spacing a plurality of rolls of material such as cellophane in a multi-layer stack.

SUMMARY OF THE INVENTION

The foregoing and other objects of the invention are met by molding from expandable polystyrene a generally rectangular sheet having a plurality of openings extending therethrough parallel to each other, the openings being arranged in spaced, parallel rows. Each opening preferably has a substantially elliptical cross section, the minor axis of which is substantially perpendicular to the parallel rows. In a preferred embodiment, there are twelve rows of four openings, each opening in each row being positionally aligned with a respective opening in the rows adjacent thereto. A plurality of cavities are preferably provided in the surface of the sheet between each pair of adjacent rows except the outermost pairs of adjacent rows.

A stack of the rectangular expandable polystyrene sheets is placed in a single grid electric wire cutter and a plurality of parallel, hot wires are then passed through the stack of sheets thereby dividing each sheet into a plurality of elongated members. The surfaces of all of the openings in each row are each substantially bisected into two substantially semicylindrical portions by a respective one of the wires. The elongated members are of two types, one type having a plurality of spaced, transverse grooves on one side thereof, and the other type having a plurality of spaced, transverse grooves on opposite sides thereof. In the preferred embodiment, each expandable polystyrene sheet yields precisely the number of elongated members required to support and space thirty-two standard rolls of cellophane material on a pallet in a four-layer stack.

BRIEF DESCRIPTION OF THE DRAWINGS

Other objects, purposes and advantages of the invention will be apparent to persons acquainted with apparatus of this general type upon reading the following description and inspecting the accompanying drawings, in which:

FIG. 3 is a perspective view of an end member produced according to the present invention;

FIG. 4 is a perspective view of a spacer member produced according to the present invention; and FIG. 5 is a perspective view of a multi-layer stack of rolls supported and spaced on a pallet by the end members and spacer members of the present invention.

Figure 1:
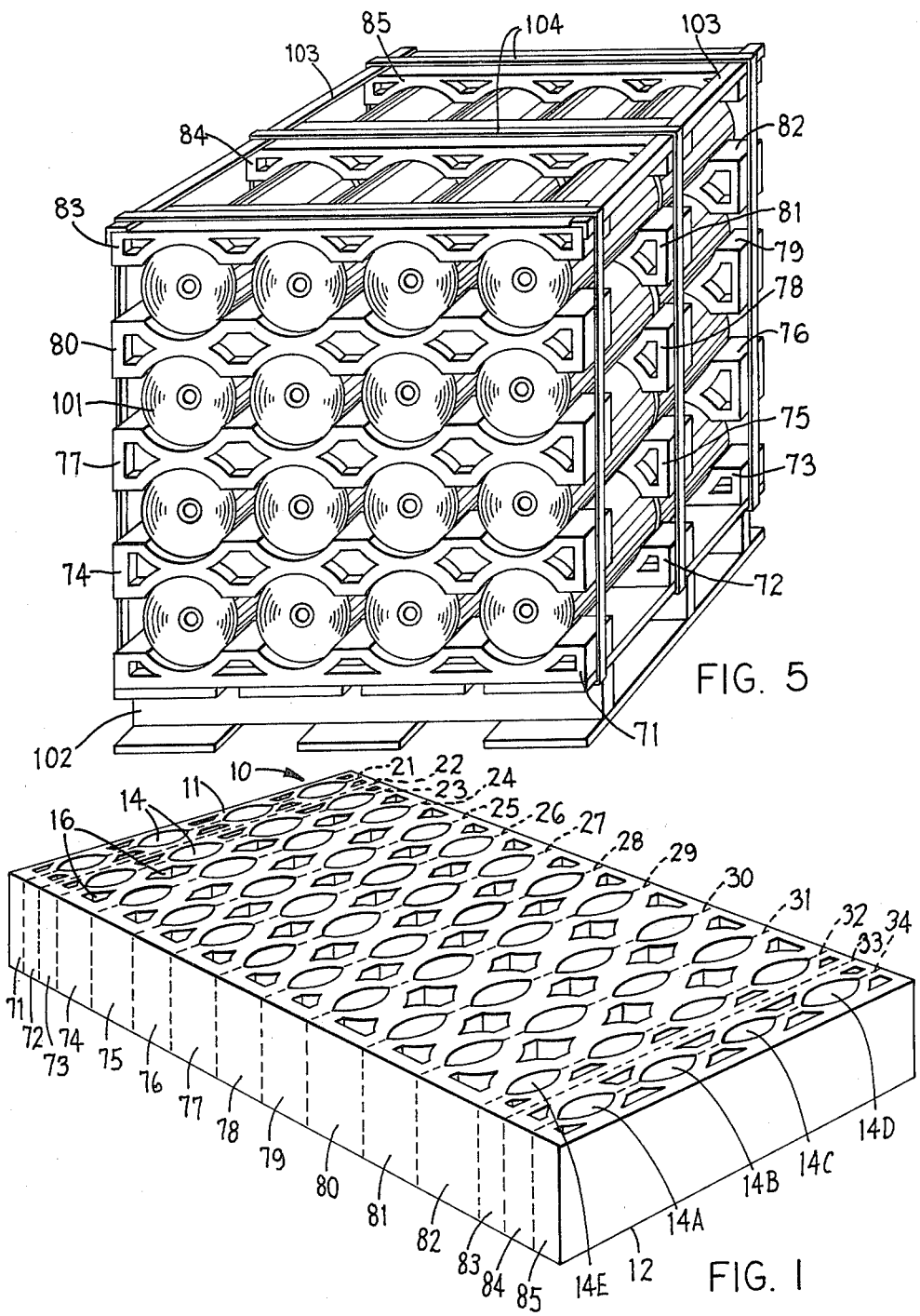
FIG. 1 is a perspective view of the expandable polystyrene sheet of the present invention.

Certain terminology will be used in the following description for convenience in reference only and will not be limiting. The words "up" and "down" will designate directions in the drawings to which reference is made. The words "in" and "out" will respectively refer to directions toward and away from the geometric center of an element or device and designated parts thereof. Such terminology will include the words specifically mentioned, derivatives thereof and words of similar import.

DETAILED DESCRIPTION

Referring to FIG. 1, a sheet 10 molded from expandable polystyrene in a conventional manner is of generally rectangular shape and has top and bottom surfaces 11 and 12 which extend parallel to each other.

The sheet 10 has a plurality of spaced, parallel openings 14 which extend therethrough from the top surface 11 to the bottom surface 12 and are arranged in parallel rows. In the preferred embodiment of FIG. 1, there are forty-eight openings 14 arranged in twelve rows, each row having four openings 14 and being spaced a substantially uniform distance from adjacent rows. As illustrated in FIG. 1, each of the openings 14 is preferably of substantially elliptical cross section, oriented so that the major axis of the ellipse extends parallel to the rows of openings and the minor axis of the ellipse is perpendicular to the rows of openings.

Five shallow cavities 16 are provided in the top surface 11 of the sheet 10 between each pair of adjacent rows of openings 14. The cavities 16 are spaced from the openings 14 and from each other to optimally core the sheet and facilitate more uniform curing during the molding process of the thicker portions of the sheet 10. Similar cavities are provided in the bottom surface 12 in a symmetric fashion. Thus, and as shown in FIG. 1, there are four cavities 16 spaced symmetrically around each opening 14.

More specifically, and referring to FIG. 1, the expandable polystyrene sheet 10 has a uniform material thickness throughout equal to the spacing between the top and bottom surfaces 11 and 12. Further, the edge surfaces of the sheet each have a height equal to the aforesaid material thickness.

Figure 2:
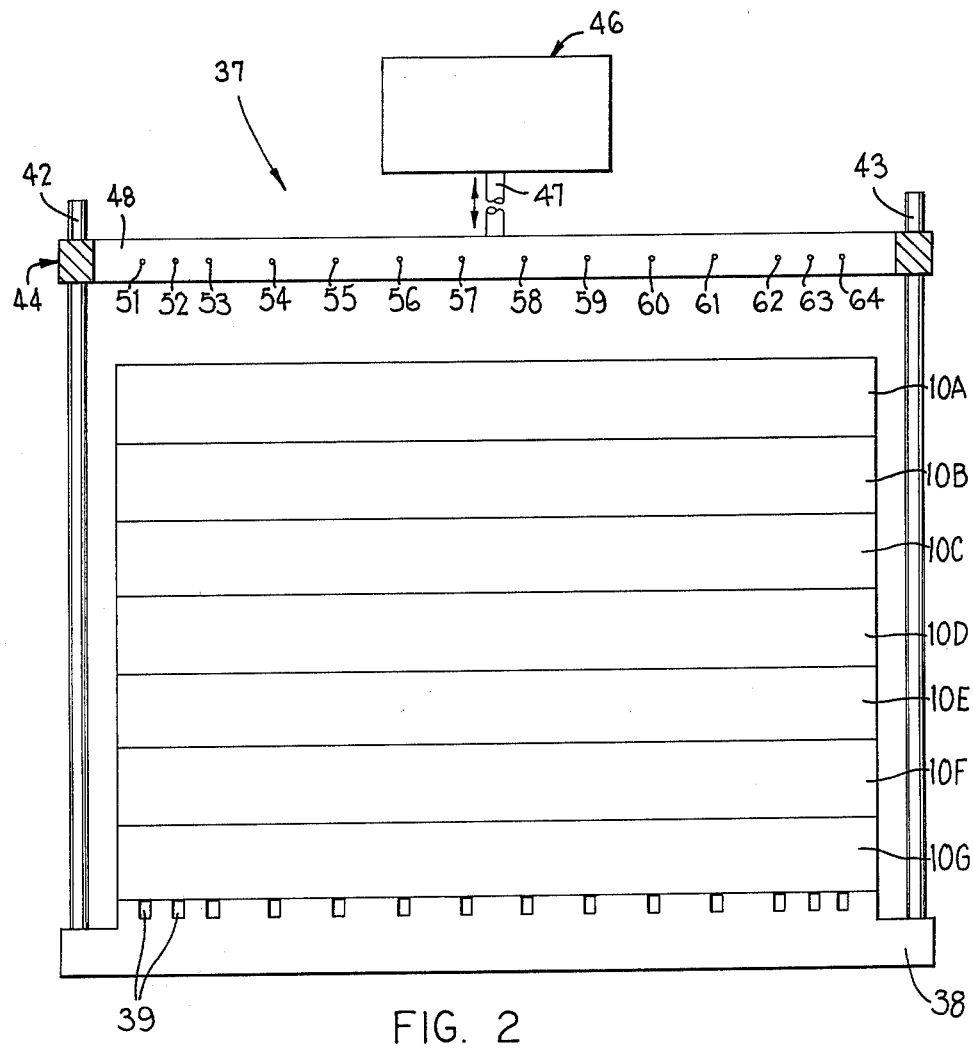
FIG. 2 is a schematic side view of a single grid electric wire cutter.

Referring to FIG. 2, a single grid electric hot wire cutter is designated generally by the reference numeral 37. The wire cutter 37 is of a conventional type and is therefore not described here in extensive detail. The wire cutter 37 has a base 38 with fourteen transversely extending slots 39 in the top thereof. Upright guide members 42 and 43 are mounted to the base 38 at opposite ends thereof and a hot wire grid 44 is slidably supported on the guide members 42 and 43 for reciprocal vertical movement. A drive mechanism 46 of conventional design is operatively connected to the grid 44 by a drive element 47 and effects the reciprocal vertical movement of the grid 44 on the guide members 42 and 43.

The hot wire grid 44 has a pair of spaced and parallel wire support bars 48, one of which is illustrated in FIG. 2. Extending tautly between the wire support bars 48 are fourteen spaced and parallel cutting wires 51–64 which are electrically heated in a conventional manner to a temperature sufficiently hot to quickly melt polystyrene brought into contact with them. The wires 51–64 of the grid 44 and the slots 39 in the base 38 are positioned so that, in the lowermost position of the grid 44, each of the wires 51–64 is received in a respective one of the slots 39.

A vertical stack of seven of the sheets 10, designated in FIG. 2 by the reference numerals 10A–10G, is placed on top of the base 38 beneath the hot wire grid 44. The drive mechanism 46 is then actuated, and acts through the drive element 47 to move the grid 44 downwardly. The two wire support bars 48 pass on opposite sides of the stack 10A–10G and the hot cutting wires 51–64 each melt a path through the sheet 10, thereby dividing each sheet 10A–10G simultaneously into fifteen elongated members. Specifically, the hot wires 51–64 respectively subdivide the sheet 10 along vertical planes which, referring again to FIG. 1, are designated by broken lines and the respective reference numerals 21–34. The sheets 10A–10G are positioned in the wire cutter 37 so that the cutting wires 51, 53–62 and 64 each bisect the surface of each of the openings 14 in a respective row of such openings into two substantially semicylindrical portions. The cutting wires 52 and 63 slice through the sheet 10 intermediate the two outermost rows of openings 14 at respective ends of the sheet 10.

The fifteen separate members into which each sheet 10 is subdivided into two end zones and central zone between the two end zones by the fourteen cutting wires 51–64 are designated by reference numerals 71–85 in FIG. 1. The six members 71–73 and 83–85 are end members which are derived from the end zones, and the members 74–82 are spacer members derived from the central zone. The end members 71–73 and 83–85 and the spacer members 74–82 are described in greater detail hereinafter.

The end member 71 is illustrated in FIG. 3. End member 71 is elongated and of a generally rectangular shape, and has four spaced, transverse grooves 88 in one side thereof. The grooves 88 are each defined by a substantially semicylindrical surface which defined a portion of the surface of one of the openings 14 before the sheet 10 was subdivided. The width 91 of the side having the grooves 88 is preferably greater than or equal to the width 92 of the adjacent side of the member 71, so that the member 71 will be stable in use and will not have a tendency to tip. End members 72, 73 and 83–85 are substantially identical in size and shape to the end member 71 and are therefore not described in detail.

FIG. 4 is an illustration of spacer member 74. Spacer member 74 is elongated and of generally rectangular shape. Four spaced, transverse grooves 95 are provided on one side of the member 74, and four spaced, transverse grooves 96 are provided on the opposite side of the member 74, each aligned with a respective groove 95. The width 98 of the sides having the grooves 95 and 96 is preferably greater than or equal to the width 99 of the adjacent sides of the member 74, so that the member 74 will be stable in use and not have a tendency to tip over.

FIG. 5 illustrates how thirty-two rolls 101 of a material like cellophane can be stacked on a pallet 102 using the members 71–85. Three end members 71–73 are first placed in a spaced relationship on top of the pallet 102 with the grooves therein facing upwardly. A layer of eight rolls of material 101 is then placed in the grooves in the end members 71–73, four of the rolls being supported by the end members 71 and 72 and the other four being supported coaxial therewith by the end members 72 and 73. Three spacer members 74–76 are then positioned on top of the first layer of rolls 101 and above the end members 71–73, respectively, and a second layer of eight rolls 101 is placed in the upwardly facing grooves of the spacer members 74–76. Two additional layers are then added to the stack in a similar manner, utilizing the remaining rolls 101 and the spacer members 77–82. The end members 83–85 are then placed on the top layer of rolls 101 in a spaced relationship and angle bars 103 are added to protect the edges of the end members 83–85. Metal strapping 104 is then utilized to securely strap the multilayer stack to the pallet 102 and to stabilize the various layers of the stack.

As shown in FIG. 1, the outer end of each roll 101 is preferably spaced inwardly from the outermost side of each of the outermost of the members 71–85 in order to provide increased protection for the rolls 101.

Although a particular preferred embodiment of the invention has been disclosed in detail for illustrative purposes, it will be recognized that minor variations or modifications thereof lie within the scope of the present invention.

The embodiments of the invention in which an exclusive property or privilege is claimed are defined as follows:

1. A premolded sheet of expandable polystyrene from which plural supporting and spacing members are adapted to be severed, said sheet having a generally elongated rectangular shape with substantially parallel top and bottom surfaces and a uniform material thickness throughout equal to the spacing between said top and bottom surfaces and generally smooth, laterally facing edge surfaces having a height equal to said material thickness, said sheet being divided into first and second zones located at opposite longitudinal ends of said sheet and a central third zone intermediate said first and second zones, said first and second zones being the mirror image of each other and each having a plurality of first openings extending through said sheet from said top surface to said bottom surface, said first openings being arranged in at least one laterally extending row and having a substantially elliptical cross section, the major axis of which is substantially aligned with the longitudinal axis of said row, the minor axis of which is substantially perpendicular to said longitudinal axis of said row, each said first opening being equidistantly spaced along said major axis, said first and second zones each further having at least one row of first cavities provided in said top and bottom surfaces, which said first cavities do not extend through said sheet, each said first cavity being located between mutually adjacent ones of said first openings and having first wall means optimally coring said sheet between said row of first openings and a lateral edge surface of said sheet throughout said first and second zones, said central third zone having at least one row of second cavities therein which are equidistantly spaced from each other and from said first openings in said first and second zones and equidistantly spaced from said major axes of said first openings, which said second cavities do not extend through said sheet, each said second cavity having second wall means optimally coring said sheet between said first and second zones throughout said third zone whereby a severing of said sheet along said major axis will produce at least one component from each of said first and second zones which are identical to each other and at least one further component from said third zone.

2. The polystyrene sheet of claim 1, wherein said third zone has plural parallel rows of second openings identical to said first openings and aligned so that the major axes thereof are parallel to the major axes of said first openings and plural parallel rows of said second cavities intermediate each row of said second openings and intermediate each row of mutually adjacent rows of said first and second openings for those of said second cavities adjacent said first openings, each said second cavity having second wall means optimally coring said sheet between said rows of said second openings throughout said central third zone.

3. The polystyrene sheet of claim 2, wherein each said first and second zones includes at least two rows of said first openings and includes two additional rows of said first cavities located between said pair of rows of first openings with each including said first wall means for optimally coring said sheet between said rows of said first openings and said lateral end surface of said sheet throughout said first and second zones whereby a severing of said sheet along said major axes and along a line parallel to said major axes but between said two additional rows of said first cavities will produce three components from each of said first and second zones, each identical to the other and plural components from said third zone.

4. The polystyrene sheet of claim 3, including eight said rows of said second openings and two rows of said first openings in each of said first and second zones.

5. The polystyrene sheet of claim 4, wherein each said row includes four said openings, each said opening in each said row being positionally aligned with a respective said opening in each said row adjacent thereto.

* * * * *